United States Patent [19]
Thurner et al.

[11] Patent Number: 4,811,883
[45] Date of Patent: Mar. 14, 1989

[54] FASTENING ELEMENT SETTING DEVICE WITH SETTING INDICATOR

[75] Inventors: Elmar Thurner, Feldkirch; Reinhard Buhri, Frastanz, both of Austria

[73] Assignee: Hilti Aktiengesellschaft

[21] Appl. No.: 136,113

[22] Filed: Dec. 21, 1987

[30] Foreign Application Priority Data

Dec. 20, 1986 [DE] Fed. Rep. of Germany ....... 3643663

[51] Int. Cl.$^4$ .............................. B25C 1/14; B25C 1/18
[52] U.S. Cl. ...................................... 227/10; 227/156
[58] Field of Search ........................ 227/9, 10, 11, 156

[56] References Cited

U.S. PATENT DOCUMENTS 3,382,751 5/1968 Kopf ...................................... 227/10
4,492,329 1/1985 Benson et al. ......................... 227/10

Primary Examiner—Paul A. Bell
Attorney, Agent, or Firm—Toren, McGeady & Associates

[57] ABSTRACT

An explosive powder charge operated fastening element assembly setting device is used to drive a fastening element into a hard receiving material such as concrete, steel and the like. The device includes a striker piston transmitting driving force to the fastening element assembly. The forward end of the striker piston has a marking projection. If excessive driving energy is transmitted from the striker piston to the fastening element assembly, the marking projection forms an imprint in a guidance disk of the assembly. The extent of the imprint provides a gauge of the excessive driving force which results in unsatisfactory insertion of the fastening element. If an annularly-shaped marking projection is used, the imprint formed by it can be viewed from all sides of the fastening element.

8 Claims, 2 Drawing Sheets

FASTENING ELEMENT SETTING DEVICE WITH SETTING INDICATOR

BACKGROUND OF THE INVENTION

The present invention is directed to an explosive powder charge operated setting device for driving fastening elements, such as studs and nails, into hard receiving materials, such as concrete, steel and the like, where the driving energy is transmitted to the fastening element by a striker piston and the fastening element is equipped with at least one guidance disk.

In so-called direct installation, that is where the fastening elements are driven into the receiving material without any pre-drilling, there are a number of advantages compared to other attachment procedures. For one thing, the installation period is shortened with a corresponding saving in costs. Moreover, loads can be applied directly to the fastening elements.

Direct attachment of fastening elements is quite exacting with regard to the manner in which the direct installation is carried out. The required driving energy varies depending on the type and thickness of the material of the component to be attached and the nature of the receiving material. If the driving energy is too high, the striker piston impacts at the end of the driving operation against the guidance disk resting against the component to be attached. When this occurs, there is a so-called jarring blow which can lead to a loosening of the fastening element driven into the receiving material. Accordingly, the required anchoring values of the fastening elements are not achieved.

The evaluation criteria for the anchored condition of a fastening element is its depth penetration into the receiving material and this can be determined from the degree of deformation of the guidance disk. In the original condition, the guidance disks are not intended to be flat. Making such an evaluation, however, requires considerable experience and specialized knowledge of the user.

SUMMARY OF THE INVENTION

Therefore, the primary object of the present invention is to provide a device which affords a simple evaluation of the anchored condition of directly installed fastening elements.

In accordance with the present invention, the striker piston at its driving end has at least one marking projection which becomes imbedded in the guidance disk if the driving energy or force is excessive.

By means of the marking projection at the front end of the striker piston, the insertion or installation of fastening elements can be judged by the same criteria. At the end of the insertion of the fastening element into the receiving material, if the guidance disk does not show any imprint or impression made by the marking projection, it can be deduced that the required driving force has not been exceeded and that the desired anchoring values have been achieved. On the other hand, when a fastening element has been completely driven, if the guidance disk shows impressions or imprints made by the marking projection, then it can be determined that the required driving force has been exceeded and the desired anchoring values cannot be assured. Since such an evaluation is made on the spot, without any auxiliary means, the required adjustment measures, such as using different cartridge strengths, or changing the driving force in the setting device, can be immediately effected and additional improper driving can be prevented. The imprints formed in the guidance disk enable an objective judgment of the insertion of the fastening element in the receiving material when multiple fastening elements are to be driven.

When the marking projection penetrates into the guidance disk, a portion of the material in the disk is displaced. It is possible that very high forces can develop and at least a portion of the excess driving force can be converted into deformation work. To achieve such a conversion, the marking projection is preferably formed as a wedge-shaped cutting edge. Such a cutting edge can penetrate into the guidance disk, even if only a small excess driving force is involved. Resistance to penetration rises steeply with increasing penetration depth, because of the wedge shape of the cutting edge. Accordingly, the imprint left by the marking projection and indicating a reduction in the required anchoring values, functions over a considerable range of excessive driving force.

Preferably, the marking projection is annularly shaped, encircling the fastening element. The annularly shaped configuration of the marking projection makes it possible to recognize clearly in actual practice from all sides of the fastening element whether the element has been driven into the receiving material with the correct driving force or at an excessive driving force. With an annularly shaped marking projection, if there is excess driving force, an impression is made in the surface of the guidance disk, even if the setting device has been applied against the surface of the receiving material, somewhat deviating from a perpendicular position with regard to the surface.

To avoid damaging the guidance disk by the marking projection, it is desirable if the marking projection is formed as one or more segments of an annulus. The imprint caused in the guidance disk as a result of excessive driving energy is formed over only partial regions of the surface of the disk. Such interrupted imprints can, however, be clearly read or observed. If several different marking projections are used, the projections can have different dimensions so that different levels of excessive driving force can be determined. Marking projections in the form of segments of an annulus can be fabricated in a simple manner on the striker piston generally by means of a lathe.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE INVENTION

Figure 1:
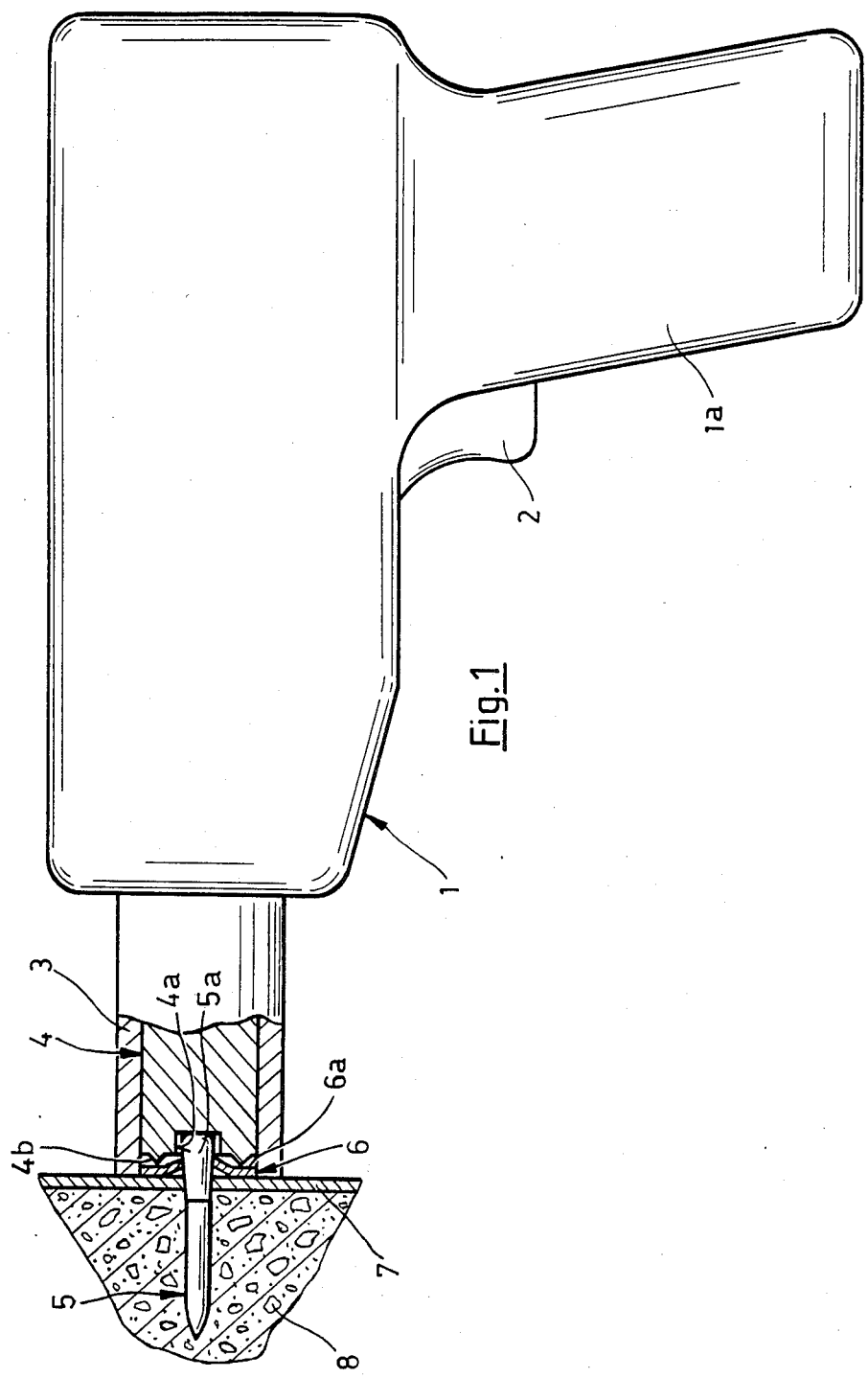
FIG. 1 is a side elevational view, partly in section, of a setting device, embodying the present invention, driving a fastening element into a receiving material.
Figure 2:
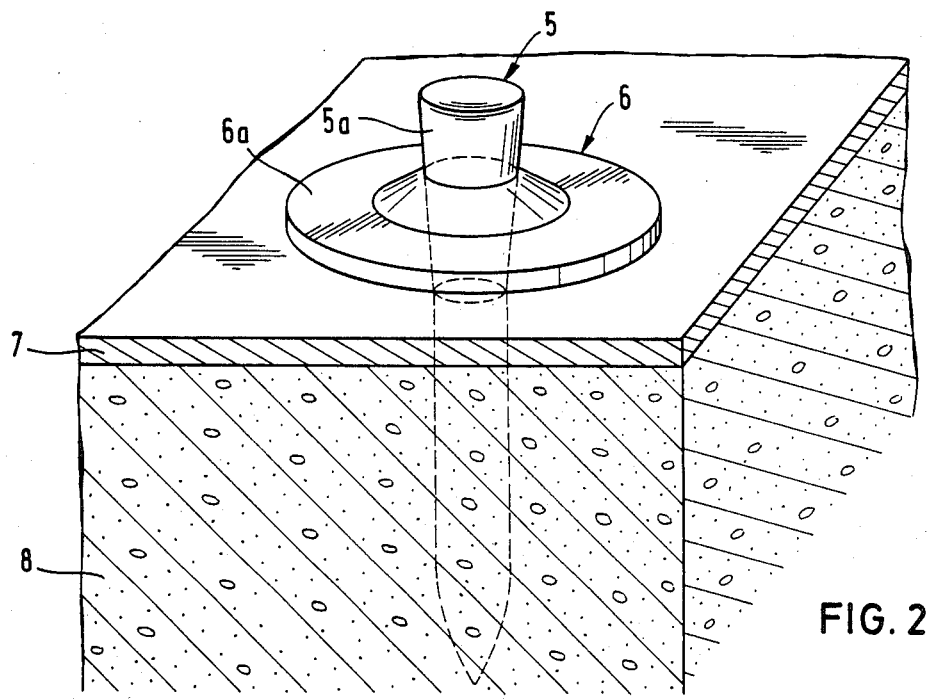
FIG. 2 is a perspective view of a fastening element driven into the receiving material with a correctly proportioned amount of driving force.
Figure 3:
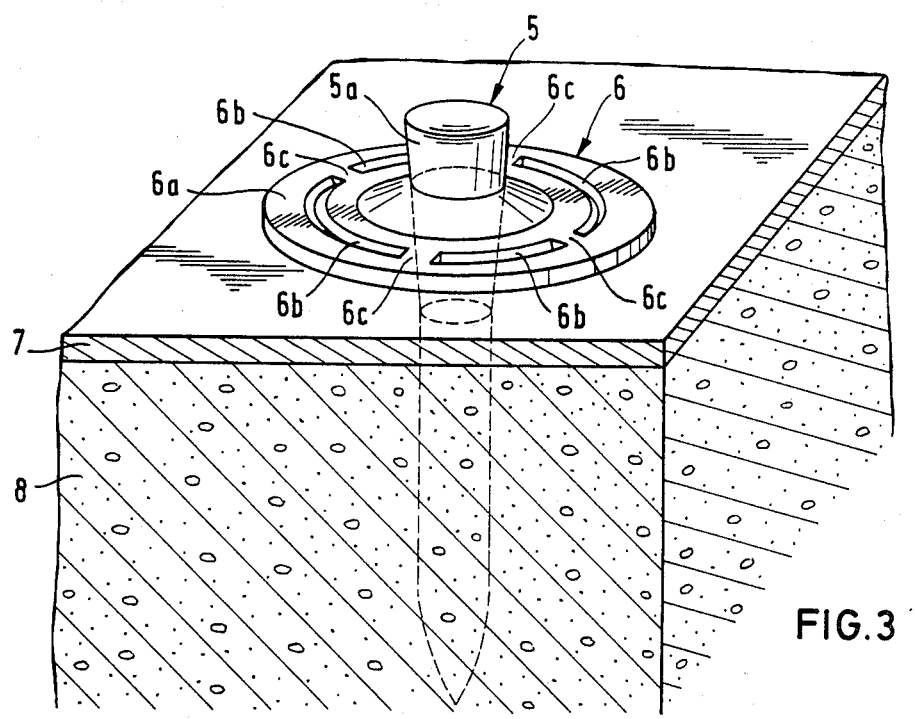
FIG. 3 is a perspective view, similar to FIG. 2, however, illustrating the result of an excessive driving force applied in driving the fastening element.

In FIG. 1, an explosive powder charge operated setting device for driving fastening element assemblies into a receiving material is illustrated and includes a housing 1 in the form of a hand-held tool. The housing 1 has a forward end, shown on the left in FIG. 1. The rearward end of the housing has a downwardly extending handle 1a, and a trigger 2 is located in the handle for initiating the fastening element setting procedure. An axially extending striker piston 4 is located in the housing and is axially displaceably supported in a fastening element guide 3, shown partially in section and projecting in the firing direction of the device from the forward end of the housing. Striker piston 4 has a forward end in the fastening element driving direction with a central recess 4a and a marking projection 4b spaced outwardly from and extending around the recess. The marking projection 4 is annularly shaped and has a wedge-shaped cutting edge as can be seen in cross-section in FIG. 1. The fastening element is a stud or nail 5 with a head 5a at its rearward end and the head widens toward the rearward end and is inserted into the recess 4a. A guidance disk 6 is positioned on the stud 5 in the region of the head 5a. Guidance disk 6 is approximately dish-shaped and has a radially outer flat edge surface 6a. In the setting procedure, illustrated in FIG. 1, stud 5 has been driven by the striker piston 4, through a component 7, into the receiving material 8. When the stud 5 penetrates into the receiving material 8, the guidance disk 6 in the region of the head 5a is displaced rearwardly toward the rearward end of the stud 5. If the driving force has been correctly proportioned, the relative displacement of the guidance disk 6 on the stud 5 occurs only to the extent that the marking projection 4b on the forward end of the striking piston 4, does not penetrate into the surface of the disk. In FIG. 2, the stud 5 is shown driven into the receiving material 8 with the proper driving force so that the marking projection 4b does not leave an imprint in the surface of the guidance disk in the region of its flat edge surface 6a. If the fastening element or stud 5 is driven into the receiving material with excessive driving force, at the end of the setting procedure, the marking projection 4b on the striker piston 4 presses into the flat edge surface 6a of the guidance disk 6 and leaves an imprint or impression. In FIG. 3, the fastening element assembly is shown driven into the receiving material with excessive driving force. As a result, the marking projection or projections 4b are pressed into the flat edge surface 6a of the guidance disk 6 so that after the completion of the driving procedure, by observation of the surface of the guidance disk, it can be concluded that the driving force was too high or excessive. When the driving force is excessive, the required pull-out values for the fastening element usually cannot be obtained. If the imprints 6b are formed in the surface of the guidance disk after the completion of the attachment of the fastening element into the receiving material, the operator can determine that the driving force must be reduced by using other cartridge strengths or by a possible adjustment of the driving force provided by the setting device. By forming the marking projection 4b as a number of individual annular segments in spaced angular relation, then webs 6c remain between the imprints 6b in the surface of the guidance disk 6 affording a good judgment of the penetration depths of the individual marking projections 4b into the guidance disk, making it possible to judge accurately the magnitude of the excessive driving force employed.

While specific embodiments of the invention have been shown and described in detail to illustrate the application of the inventive principles, it will be understood that the invention may be embodied otherwise without departing from such principles.

We claim:

1. Explosive powder charge operated setting device for driving a fastening element assembly including a guidance disk, mounted on a fastening element, such as a nail, stud and the like, into a hard receiving material, such as concrete, steel and the like, where said guidance disk encircles and extends radially outwardly from said fastening element, said setting device having a fastening element setting direction and a forward end, an axially extending striker piston axially displaceably mounted in said housing for driving a fastening element assembly in the setting direction out of the forward end of said housing into the receiving material, wherein the improvement comprises that said striker piston has a forward face directed in the setting direction for contacting the fastening element in the driving operation, at least one marking projection formed on and extending outwardly from the forward face of said striking piston for embedment into the guidance disk when excessive driving energy is transmitted by said striker piston to the fastening element assembly.

2. Explosive powder charge operated setting device, as set forth in claim 1, wherein said marking projection is wedge-shaped in cross-section extending outwardly from the forward face of said striker piston.

3. Explosive powder charge operated setting device, as set forth in claim 2, wherein said marking projection is annularly shaped and encircles a surface on the forward face of said striker piston arranged to contact the fastening element in the driving operation.

4. Explosive powder charge operated setting device, as set forth in claim 2, wherein said marking projection is in the form of a segment of an annulus.

5. Explosive powder charge operated setting device, as set forth in claim 2, wherein said marking projection is in the form of a plurality of annular segments in angularly spaced relation.

6. Explosive powder charge operated setting device, as set forth in claim 1, wherein said marking projection is annularly shaped and encircles a surface on the forward face of said striker piston arranged to contact the fastening element in the driving operation.

7. Explosive powder charge operated setting device, as set forth in claim 1, wherein said marking projection is in the form of a segment of an annulus.

8. Explosive powder charge operated setting device, as set forth in claim 1, wherein said marking projection is in the form of a plurality of annular segments in angularly spaced relation.

* * * * *